United States Patent [19]
Eickhof

[11] 3,814,059
[45] June 4, 1974

[54] HYDRAULICALLY ELEVATED BIRDHOUSE CONSTRUCTION

[76] Inventor: John K. Eickhof, Box 598, Crookston, Minn. 56716

[22] Filed: Dec. 16, 1971

[21] Appl. No.: 208,800

[52] U.S. Cl. ................................................ 119/23
[51] Int. Cl. ............................................ A01k 31/00
[58] Field of Search .............................. 119/21–26, 119/13–17, 19, 51; 254/93 R, 93 VA, 93 L, 93 H; 220/8

[56] References Cited
UNITED STATES PATENTS

| | | | |
|---|---|---|---|
| 1,610,499 | 12/1926 | Dybens | 254/93 H |
| 2,807,438 | 9/1957 | Frank | 254/93 R |
| 2,930,582 | 3/1960 | Foster | 254/93 R |
| 3,367,632 | 2/1968 | Vail | 119/23 X |

FOREIGN PATENTS OR APPLICATIONS

| | | | |
|---|---|---|---|
| 503,852 | 7/1930 | Germany | 119/23 |

*Primary Examiner*—Louis G. Mancene
*Assistant Examiner*—J. N. Eskovitz
*Attorney, Agent, or Firm*—Cecil C. Schmidt et al.

[57] ABSTRACT

A hydraulically raisable and lowerable birdhouse construction comprising a nesting structure mounted on a telescopic pole assembly. The birdhouse is raisable by the introduction of a fluid (e.g. water) into a rigidly mounted, outer pole section elevating a telescopic, inner pole section and the birdhouse attached thereto. The birdhouse is retained in its elevated position by suitable means (e.g. a holding bolt engaging both the inner and outer pole sections) and the water allowed to escape from the outer pole section through a weep hole therein. To facilitate maintenance of the lowered birdhouse, the outer shell (i.e., the exterior walls and roof) is entirely removeable so as to fully expose the internal nesting structure.

10 Claims, 5 Drawing Figures

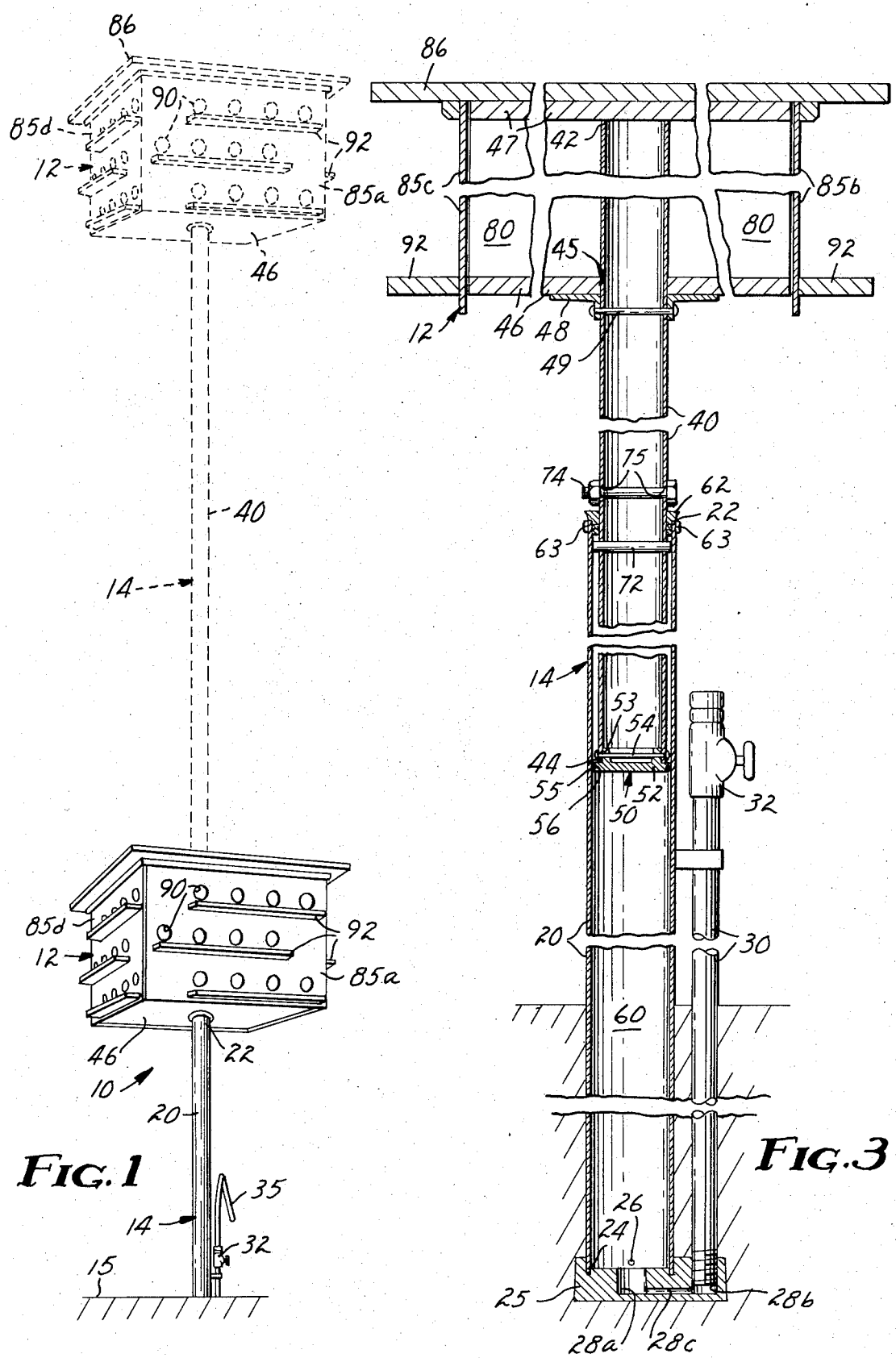

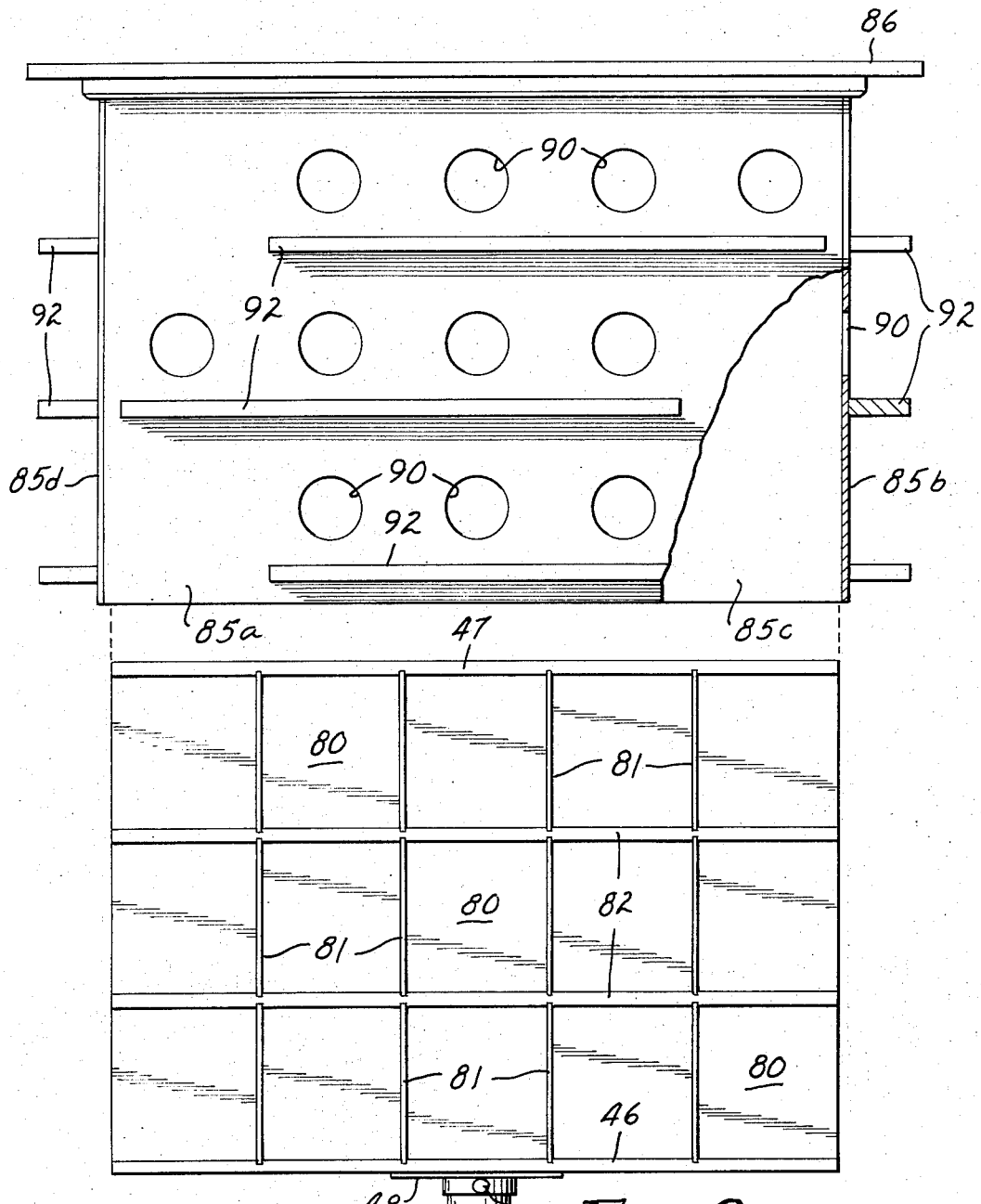
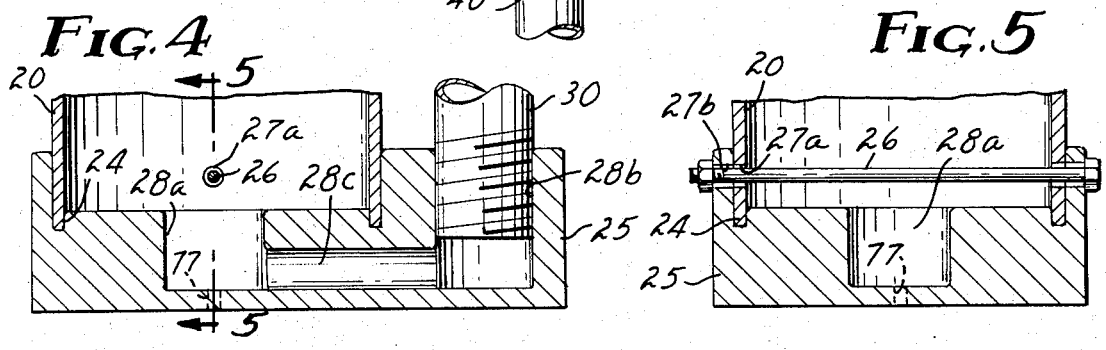

3,814,059

HYDRAULICALLY ELEVATED BIRDHOUSE CONSTRUCTION

BACKGROUND OF THE INVENTION

1. Field of the Invention

The present invention pertains to a birdhouse construction including means for hydraulically raising and lowering the attached birdhouse.

2. Description of the Prior Art

Birdhouses of various sizes and designs are frequently installed in such diverse areas as backyards, parks, playgrounds, and wildlife sanctuarys. To prevent predatory animals from attacking the birds nesting or brooding in a birdhouse, the nesting structure is commonly mounted on a pole or pipe permanently positioned in the ground and which extends a considerable height above ground level (e.g. 8-20 feet). While this serves to protect the birds nesting within the birdhouse, it renders the maintenance of the nesting structure (e.g. cleaning, painting, replenishment of bird food, etc.) extremely difficult.

Heretofore, birdhouses have been typically maintained by using means such as a ladder to reach the birdhouse allowing the maintenance to be accomplished at an elevated level. This is, of course, highly inconvenient and involves a substantial risk of physical injury unless extreme care is exercised. Alternatively, birdhouses are sometimes removed from the supporting pole or the entire pole assembly is disassembled to allow the maintenance work to be performed at ground level. As can be readily appreciated, both of these approaches are extremely undesirable in terms of the amount of time and energy which must be expended to accomplish the maintenance work. Finally, it is known to provide a manually operable, telescopic pole assembly for raising and lowering the birdhouse. See, U.S. Pat. No. 3,367,632. However, the complexity of this device and the effort required to elevate the nesting structure have rendered it generally unsatisfactory. Thus, it can be readily appreciated that a simply designed birdhouse construction which would allow the nesting structure to be easily and reliably raised and lowered would be commercially highly desirable.

SUMMARY OF THE INVENTION

The present invention provides a hydraulically operated, telescopic pole assembly suitable for raising and lowering a birdhouse. The pole assembly includes an inner pole section telescopically moveable within a vertically extending, stationary outer pole section allowing the birdhouse attached to the upper end of the inner pole to be raised and lowered. To accomplish the raising and lowering, sealing means are attached to the inner or lower end of the inner pole section to hermetically seal the inner and outer pole sections providing a fluid actuated piston for moving the inner pole section within the outer pole section. Inlet means are provided for introducing a fluid (e.g. water) into the outer pole section between a lower closed end thereof and the sealing means so as to elevate the inner pole section and attached birdhouse. In the preferred embodiment, the pole assembly includes a stop element for preventing further outward movement of the inner pole section upon reaching a desired height and a holding pin is engageable with both the inner and outer pole sections so as to mechanically retain the inner pole section in its elevated position. With the birdhouse so retained, the fluid is allowed to escape through a weep hole in the outer pole section. Preferably, the birdhouse has an outer shell which is entirely removable to allow full access to the internal nesting structure.

The hydraulically operated, telescopic pole assembly provided by the present invention allows a birdhouse to be readily raised and lowered. By providing such a telescopic pole assembly, I have eliminated the need to perform at an elevated level the tasks necessary in properly maintaining a birdhouse. Rather, the birdhouse can be easily lowered by operation of the telescopic pole assembly allowing the tasks to be performed at ground level. This, of course, renders the maintenance work substantially easier and also eliminates the risk of injury involved when working at an elevated level. In addition, the removeability of the outer shell of the preferred nesting structure further facilitates maintenance work on the lowered structure. Other advantages of my invention, such as its relative simplicity of design, will become apparent from a reading of the Detailed Description which follows.

BRIEF DESCRIPTION OF THE DRAWINGS

FIG. 1 is a perspective view of the birdhouse construction provided by the present invention showing the nesting structure in both its lowered position (solid lines) and in its elevated position (dotted lines);

FIG. 2 is an exploded, front elevational view of the preferred nesting structure used in conjunction with the present invention;

FIG. 3 is an axial cross-sectional view of the telescoping pole assembly utilized to raise and lower the nesting structure as shown in FIG. 1;

FIG. 4 is an enlarged cross-sectional view of the end cap member shown in FIG. 3; and FIG. 5 is a cross-sectional view taken along the line 5—5 of FIG. 4.

DETAILED DESCRIPTION OF THE PREFERRED EMBODIMENT

Turning now to the drawings, wherein like numerals represent like elements of my invention throughout the various figures, numeral 10 generally designates the birdhouse construction provided by the present invention. As used herein, the term "birdhouse" includes structures for nesting and brooding birds, feeding birds, and the like. In the illustrated embodiment, a bird nesting structure 12 suitable for nesting relatively small birds (e.g. Martins) is provided. As can be readily appreciated from FIG. 1 and as described subsequently in greater detail, nesting structure 12 is raisable and lowerable by a telescopic pole assembly 14. In the embodiment shown, the telescopic pole assembly 14 is adapted for raising and lowering the height of nesting structure 12 above ground level 15 from a height of about 4 feet in its lowermost position to a height of about 14–15 feet in its uppermost or elevated position.

With particular reference to FIG. 3, the telescopic pole assembly 14 includes a stationary outer pole section 20 which is rigidly positioned within the ground so as to extend vertically upward to a height of about 3–5 feet (e.g. 4 feet) above ground level 15. The upper end 22 of the outer pole section 20 is generally open. A lower second end 24 of pole section 20 is substantially closed by a cap member 25. The cap 25 is attached to end 24 by a bolt 26 extending transversely through an opening 27a in outer pole section 20 and an opening 27b in cap member 25. For reasons explained subsequently, openings 27a and 27b have a slightly larger diameter than bolt 26. Finally, the cap member 25 defines a fluid conduit therein in the form of a vertically extending conduit portion 28a opening into the interior of outer pole section 20, a vertically extending conduit portion 28b opening into the exterior of outer pole section 20, and a transversely extending conduit portion 28c connecting conduit portions 28a and 28b. As shown, the external conduit portion 28b is internally threaded for receiving a pipe 30. The pipe 30 extends vertically upward to a point above ground level 15. A hand operated valve 32 is connected to pipe 30 above ground level 15 and is attachable to a fluid source such as a garden hose 35 for providing a supply of water.

Telescopically positioned within outer pole section 20 is an inner pole section 40. The inner pole section 40 includes an upper first end 42 and a lower second end 44. As shown, the upper end portion of inner pole section 40 extends through an opening 45 in the base platform 46 of nesting structure 12, the upper end 42 engaging a horizontally extending member 47 of the internal nesting structure. An annular flange member 48 is positioned about inner pole section 40 for supporting the understructure of base platform 46. Flange member 48 is affixed to inner pole section 40 by a bolt 49 extending transversely therethrough. Finally, a sealing means 50 is attached to the lower end 44 of inner pole section 40. The sealing means 50 includes a disc-shape member 52 having a slightly larger diameter than inner pole section 40. An inner, annular flange portion 53 of disc 52 fits within the lower end 44 of pole section 40 and a bolt 54 extends through inner pole 40 and flange portion 53 to secure disc 52 to pole 40. An O-ring 55 is positioned within an annular groove 56 in the disc member 52 and engages the inner wall of outer pole section 20 to provide a hermetical seal between the inner and outer pole sections. As such, sealing means 50 provides a fluid actuated piston for moving the inner pole section 40 longitudinally within the outer pole section 20. Thus, in effect, the sealing means 50 converts the lower end of inner pole section 40 to a fluid operable piston for causing pole 40 and the attached nesting structure 12 to move upwardly upon the introduction of a suitable fluid into a chamber 60 defined by outer pole section 20 between the closed end 24 thereof and the sealing means 50.

An annular stop member 62 is positioned at the open first end 22 of outer pole 20 and is secured thereto by a pair of screws 63. Other suitable fastening means (e.g. various adhesives) can be utilized. Member 62 functions as a stop member to prevent further upward movement of inner pole section 40 upon the engagement of a pin 72 therewith, pin 72 extending transversely through inner pole 40. Further, the annular member 62 functions in conjunction with a bolt 74 extending through the inner pole section 40 above member 62 to serve as a mechanical means for retaining the inner pole section 40 and attached nesting structure 12 in its elevated position. As shown, bolt 74 extends transversely through inner pole section 40 so as to rest on annular member 62 preventing downward movement of the inner pole 40.

The operation of birdhouse construction 10 can be described as follows. During the initial erection process, the outer pole 20 is installed within the ground in the manner illustrated in FIGS. 1 and 3. Installation of pole 20 to a depth of about 6–8 feet below ground level 15 provides sufficient rigidity for maintaining the proper positioning of the assembled birdhouse construction. During the positioning of outer pole 20 fixedly within the ground, inner pole section 40 can be either in its retracted, lowermost position or entirely removed from outer pole 20 and installed thereon subsequent to the mounting of pole 20. Preferably, the inner pole section 40 is of slightly greater length than the outer pole section 20 (e.g. 1–12 inches) so that on positioning the inner pole 40 to its lowermost position within outer pole 20 an upper end portion of pole 40 will project outwardly from the open end 22. With inner pole section 40 positioned in its lowermost position, the nesting structure 12 is mounted on the upper end portion of pole 40, the opening 45 in bottom base plate 46 receiving pole 40. The flange member 48 is then properly secured beneath base 46 to provide support thereto. To raise the nesting structure 12, garden hose 35 is connected to valve 32 and valve 32 opened to allow introduction of water into the cylinder chamber between end 24 of outer pole section 20 and the sealing means 50 attached to inner pole 40. As this occurs, the water pressure exerts an upward force on sealing means 50 causing the inner pole section 40 and attached nesting structure 12 to move upwardly until the pin 72 engages the annular stop member 62. This engagement prevents further upward movement of inner pole 40 with approximately 2 feet of pole 40 remaining within outer pole 20. This provides strength to the raised inner pole 40 preventing undue swaying movement. The bolt 74 is then extended through the opening 75 in the inner pole section 40 and a nut threadedly connected thereto. If desired valve 32 can then be turned to its off position. Upon doing so, the water introduced into the cylindrical chamber 60 defined by outer pole section 20 and sealing means 50 slowly exhausts through the openings 27a and 27b, the space between bolt 26 and openings 27a and 27b serving as a weep hole for draining the water. A separate or additional leak hole can also be provided (such as shown in dotted lines in FIG. 4 and designated by the numeral 77). Upon outward passage of water from the chamber 60, the inner pole section 40 moves downwardly until bolt 74 engages the annular stop member 62 preventing further downward movement.

To lower the raised nesting structure 12, the bolt 74 is removed allowing the upper pole section 40 to telescope within the outer pole section 20 until it returns to its lowermost position. When lowering the pole section 40 in this manner, it has been found that the inner pole section initially descends rapidly and then deaccelerates as the downward movement of sealing means 50 compresses the air which has entered the outer pole section 14 through openings 27a and 27b upon the exhaustion of the water therefrom. As the compressed air leaks outwardly through the weep hole, the pole 40 continues to move downwardly to its lowermost position. Alternatively, the outer pole section 20 beneath sealing means 50 can be refilled with water before the lowering process is initiated to assure a slow, downward movement of pole section 40. Using this lowering process, the garden hose can be disconnected from valve 32 and the valve opened allowing the water introduced into outer conduit 20 to flow outwardly through valve 32 providing regulated descent of the inner pole section 40. After completion of the maintenance work on nesting structure 12, the pole section 40 can be raised as previously described.

As can be best appreciated from FIG. 2, the nesting structure 12 is constructed so as to facilitate easy maintenance thereof when the telescopic pole assembly 14 is in its lowermost position. As shown, the base platform 46 supports a plurality of cubical internal nesting compartments or units 80 which are formed by the intersection of a plurality of vertical and horizontal members 81 and 82, respectively. The number and size of the nesting compartments is, of course, a matter of design dependent upon the use to which the birdhouse is to be placed. To facilitate cleaning of the internal nesting compartments 80, the nesting structure 12 includes an outer shell for enclosing the nesting compartments and which is entirely removeable to fully expose compartments 80. As shown, the outer shell includes four vertically extending sidewalls 85a–85d defining a generally cubical volume. A pitched roof 86 is fastened to the sidewalls 85a–85d and rests upon the outer edges of vertical wall members 81 suspending the sidewalls 85a–85d about the compartments 80 in the manner shown in FIG. 1. To provide the support for the outer shell in this unattached manner, the lower edges of sidewalls 85a–85d could also rest on an outwardly projecting member (not shown) about the periphery of base platform 46. Since the outer shell is not rigidly attached to the internal nesting structure, it can be raised upwardly as shown in FIG. 2 and entirely removed to fully expose the internal compartments. Finally, each of the sidewalls 85a–85d includes a plurality of openings 90 each properly positioned to allow entrance into a different one of the nesting compartments 80 and perch platforms 92 spaced therealong.

In view of the foregoing description, it will be apparent to the artisan that my invention greatly facilitates the maintenance of birdhouses. However, since my invention has been described in conjunction with a single, preferred embodiment thereof, numerous modifications will be readily apparent to the artisan and it is my intent to be limited solely by the spirit and scope of the appended Claims.

What is claimed is:

1. A birdhouse construction comprising:
    a. means defining a birdhouse;
    b. a telescopic pole assembly including:
       i. an outer pole section having an open first end and a substantially closed second end;
       ii. an inner pole section having oppositely disposed, first and second ends and moveable telescopically within said outer pole section, said first end of said inner pole section being moveable outwardly through said open end of said outer pole section;
       iii. sealing means attached to said inner pole section adjacent said second end thereof to provide a fluid actuated piston for moving said inner pole section within said outer pole section; and
       iv. inlet means for introducing a flow of water from a water supply controllable by a water valve into said outer pole section between said closed second end thereof and said sealing means for causing said inner pole section to move longitudinally within said outer pole section, said first end of said inner pole section moving outward through said first end of said outer pole section, said inlet means including means for engaging a valve means for controlling said flow of water; c. means for mounting said birdhouse on the first end of said inner pole section.

2. The birdhouse construction of claim 1 wherein:
    a. said outer pole section includes a stop member attached thereto adjacent said first end and extending radially inward toward said inner pole section; and
    b. said inner pole section includes a stop element protruding outwardly therefrom adjacent the second end thereof for engaging said stop member attached to said outer pole section to prevent further longitudinal outward movement of said inner pole section 3. The birdhouse construction of claim 2 including means engageable with said inner and outer pole sections for mechanically retaining said inner pole section in a position having said inner pole section extending outwardly from said open end of said outer pole section.

4. The birdhouse construction of claim 3 wherein said retaining means includes an opening in said inner pole section and a holding pin extendable through said opening and engageable with said outer pole section to prevent telescopically inward movement of said inner pole section.

5. The birdhouse construction of claim 4 wherein said outer pole section includes a weep opening therein for allowing the slow exhaustion of the water introduced into said outer pole section between said closed end thereof and said sealing means.

6. The birdhouse construction of claim 1 wherein said birdhouse includes a base platform, a plurality of inner compartments supported by the upper side of said platform and an outer shell removeably supported by the periphery of said platform for enclosing said inner compartments and raisable vertically upward from said platform to entirely expose said inner compartments.

7. A birdhouse construction, comprising:
    a. means defining a birdhouse including a base platform having an upper and lower surface, a plurality of inner compartments supported by said upper platform surface, and an outer shell removeably supported by said inner compartments for substantially enclosing said inner compartments and raisable upward from said upper surface for exposing said inner compartments;
    b. mounting means for mounting said base platform on a supporting pole, and
    c. a hydraulically operable, telescopic pole assembly for raising and lowering said birdhouse comprising an inner pole and an outer pole, one end of said inner pole being attached to said base platform by said mounting means.

8. A birdhouse construction;
    a. means defining a birdhouse;
    b. a telescopic pole assembly including:
       i. an outer pole section having an open first end, a substantially closed second end, and a peripheral stop member adjacent said first end and extending radially inward from the periphery of the opening in said open first end, said outer pole having a weep opening therein in closely spaced relation to said second end and communicating with the region external to said birdhouse construction, ii. an inner pole section moveable telescopically within said outer pole section, having oppositely disposed first and second ends, said first end of said inner pole section being moveable outwardly through said open end of said outer pole section, said inner pole section including a stop element protruding outwardly therefrom adjacent the second end thereof for engaging said peripheral stop member to prevent further longitudinal outward movement of said inner pole section;

iii. retaining means engageable with said inner and outer pole sections for mechanically retaining said inner pole section in a position having said inner pole section extending outwardly from said open end of said outer pole section;

iv. sealing means attached to said inner pole section adjacent said second end thereof to provide a fluid actuated piston for moving said inner pole section within said outer pole section;

v. inlet means for introducing a flow of water from a water supply into said outer pole section between said closed second end thereof and said sealing means for causing said inner pole section to move longitudinally within said outer pole section, said first end of said inner pole section moving outward through said first end of said outer pole section;

c. means for mounting said birdhouse on the first end of said inner pole section.

9. Birdhouse construction of claim 8 wherein said retaining means includes an opening in said inner pole section and a holding pin extendable through said opening and engageable with said outer pole section to prevent telescopically inward movement of said inner pole section.

10. Birdhouse construction of claim 8 wherein said inlet means includes connecting means for connecting a garden hose thereto.

* * * * *